(12) United States Patent
Lim et al.

(10) Patent No.: US 7,238,452 B2
(45) Date of Patent: Jul. 3, 2007

(54) ELECTROLYTE FOR LITHIUM BATTERY AND LITHIUM BATTERY COMPRISING SAME

(75) Inventors: Hyun-Jeong Lim, Incheon-si (KR); Eui-Hwan Song, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/944,886

(22) Filed: Sep. 21, 2004

(65) Prior Publication Data

US 2005/0064294 A1   Mar. 24, 2005

(30) Foreign Application Priority Data

Sep. 22, 2003   (KR) ...................... 10-2003-0065550

(51) Int. Cl.
*H01M 10/40* (2006.01)
(52) U.S. Cl. .................. 429/328; 429/200; 429/332; 429/339
(58) Field of Classification Search .............. None
See application file for complete search history.

(56) References Cited

U.S. PATENT DOCUMENTS

| | | | |
|---|---|---|---|
| 5,709,968 A | 1/1998 | Shimizu | |
| 5,879,834 A | 3/1999 | Mao | |
| 6,846,594 B2* | 1/2005 | Kim et al. | 429/328 |
| 6,852,446 B2* | 2/2005 | Barbarich | 429/207 |
| 2003/0099886 A1 | 5/2003 | Choi et al. | |
| 2004/0185347 A1* | 9/2004 | Kim et al. | 429/326 |
| 2005/0019670 A1* | 1/2005 | Amine et al. | 429/326 |

FOREIGN PATENT DOCUMENTS

| | | |
|---|---|---|
| JP | 63-261680 | * 10/1988 |
| JP | 09-139233 | 5/1997 |
| JP | 9-139233 | * 5/1997 |
| KR | 2003-0033331 | 10/2001 |

* cited by examiner

*Primary Examiner*—John S. Maples
(74) *Attorney, Agent, or Firm*—Stein, McEwen & Bui, LLP

(57) ABSTRACT

An electrolyte for a lithium battery includes a non-aqueous organic solvent, lithium salts, and an additive compound of formula (1):

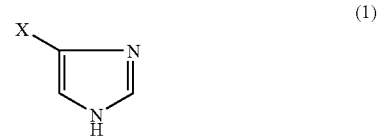

(1)

where X is selected from the group consisting of an alkyl, an alkoxy, a halogen, and an electron withdrawing group. The lithium battery having the electrolyte shows improved electrochemical properties, such as capacity at high rate and safety characteristics compared to a battery including the conventional non-aqueous electrolyte which does not include the additive compound.

27 Claims, 3 Drawing Sheets

ELECTROLYTE FOR LITHIUM BATTERY AND LITHIUM BATTERY COMPRISING SAME

CROSS-REFERENCE TO RELATED APPLICATIONS

This application is based on Korean patent application No. 2003-65550 filed in the Korean Intellectual Property Office on Sep. 22, 2003, the disclosure of which is incorporated herein by reference.

BACKGROUND OF THE INVENTION

1. Field of the Invention

The present invention relates to an electrolyte for a lithium battery and a lithium battery comprising the same, and more particularly, to an electrolyte for a lithium battery capable of improving overcharge inhibition properties and electrochemical characteristics, and a lithium secondary battery comprising the same.

2. Description of the Related Art

The use of portable electronic instruments is increasing as a size of electronic equipment becomes smaller and a weight becomes lighter due to developments in high-tech electronic industries. Studies on lithium secondary batteries are actively being pursued in accordance with the increased need for a battery having a high energy density for use as a power source in these portable electronic instruments. Such a lithium secondary battery, having an average discharge potential of 3.7 V (i.e., a battery having substantially a 4 V average discharge potential) is considered to be an essential element in the digital generation since it is an indispensable energy source for portable digital devices such as cellular telephones, notebook computers, camcorders, and the like (i.e., the "3C" devices).

Also, there has been extensive research on batteries with effective safety characteristics, such as, for example, preventing overcharge. When a battery is overcharged, an excess of lithium ions is deposited on a positive electrode, and an excess of lithium ions is also inserted into a negative electrode, rendering the positive and negative electrodes thermally unstable. An eruptive explosion occurs from a decomposition of the electrolytic organic solvent, and the thermal runaway that occurs causes serious problems of battery safety.

To overcome the above problems, it has been suggested that an aromatic compound such as an oxidation-reduction additive agent ("redox shuttle") be added to the electrolyte. For example, U.S. Pat. No. 5,709,968 discloses a non-aqueous lithium ion secondary battery to prevent thermal runaway resulting from overcharge current by using a benzene compound such as 2,4-difluoroanisole. U.S. Pat. No. 5,879,834 discloses a method for improving battery safety by using a small amount of an aromatic compound such as biphenyl, 3-chlorothiophene, furan, and the like, which is polymerized electrochemically to increase the internal resistance of a battery during unusual overvoltage conditions. Such redox shuttle additives increase the temperature inside the battery quickly due to heat produced by the oxidation-reduction reaction, and close pores of a separator through quick and uniform fusion of the separator to inhibit an overcharge reaction. The polymerization reaction of these redox shuttle additives consumes the overcharge current to improve battery safety.

However, the polymerization of these redox shuttle additives cannot sufficiently eliminate the overcharge current. In addition, decomposition of the additives causes gas generation inside the battery, and thus a certain plane of the battery swells. Therefore, improvements in the safety of the battery are limited when using the redox shuttle additives, so that there is a need for research on electrolytes to prevent overcharge and to ensure safety.

SUMMARY OF THE INVENTION

To solve the above and/or other problems, it is an aspect of the present invention to provide an electrolyte for a lithium battery to improve overcharge inhibition properties and electrochemical characteristics.

It is another aspect of the present invention to provide a lithium battery having improved overcharge inhibition properties and electrochemical characteristics.

In order to accomplish the aspects of the present invention, the present invention provides an electrolyte for a lithium secondary battery comprising a non-aqueous organic solvent, a lithium salt, and an additive compound represented by formula (1):

(1)

where X is selected from the group consisting of an alkyl, an alkoxy, a halogen, and an electron withdrawing group.

Additional aspects and/or advantages of the invention will be set forth in part in the description which follows and, in part, will be obvious from the description, or may be learned by practice of the invention.

The present invention also provides a lithium battery comprising the electrolyte.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
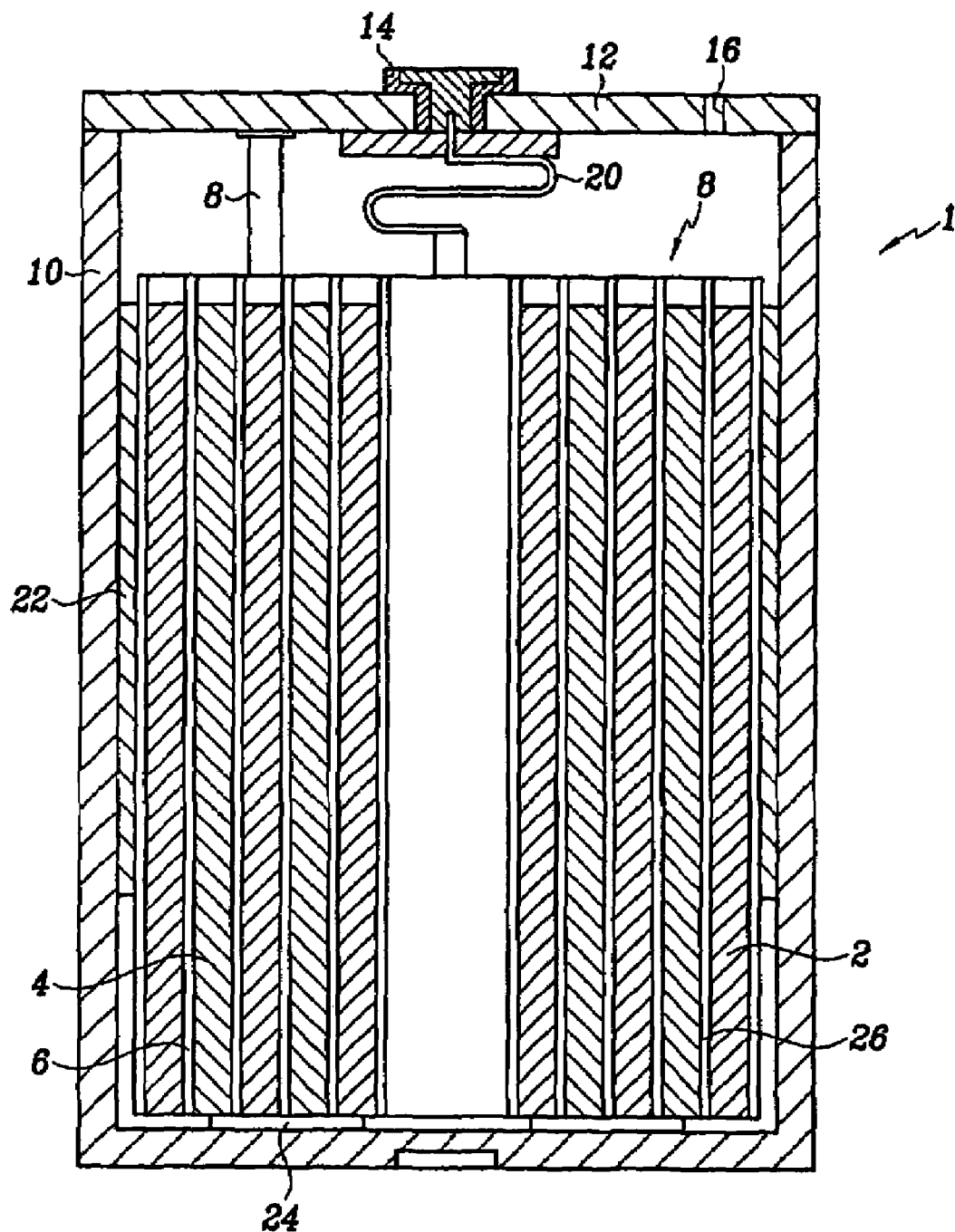
FIG. 1 is a cross-sectional view of a prismatic lithium secondary battery cell in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

In the following detailed description, embodiments of the invention are shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and negative electrode 4. Insulators 22 and 24 are installed on the lower part and the side part of the electrode assembly 8 to prevent a short circuit occurrence in the battery.

In a lithium battery, the temperature of the battery increases abruptly because of overcharge due to incorrect operation or break-down of the battery, or a short circuit occurrence due to a defect in battery design, so that thermal runaway takes place. During overcharge, an excessive amount of lithium ions are released from the positive electrode and deposited on the surface of the negative electrode to render the positive and negative electrodes unstable. As a result, exothermic reactions such as pyrolysis of an electrolyte, reactions between the electrolyte and lithium, an oxidation reaction of the electrolyte on the positive electrode, a reaction between the electrolyte and oxygen gas that is generated from the pyrolysis of the positive active material, and the like, rapidly increase the temperature inside the battery to cause thermal runaway, and thus, the generation of fire and smoke.

An electrolyte of the present invention improves the safety of a battery during overcharge by using an additive compound represented by the formula (1):

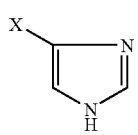

(1)

where X is selected from the group consisting of an alkyl, an alkoxy, a halogen, and an electron withdrawing group. Examples of the electron withdrawing group include halogens, $NO_2$, CN, $COCH_3$, $COOCH_3$ and the like. In this specification, the alkyl is preferably a $C_1$ to $C_{10}$ alkyl.

The compound represented by formula (1) initiates polymerization at more than 4.5 V, and forms a coating layer on a surface of the electrode to decrease internal resistance between the positive and the negative electrodes. The polymerization reaction of the compound consumes the overcharge current to improve battery safety.

Exemplary compounds include a 4-nitroimidazole, cyanomethylimidazole, chloroimidazole, and the like.

The compound is added in an amount of 0.1 to 50 wt %, preferably 0.5 to 10 wt %, and more preferably 1 to 5 wt % based on the total amount of the electrolyte. The addition effect is not realized sufficiently when the compound is used in an amount of less than 0.1 wt %, and the cycle life characteristics of the battery are decreased when the compound is used in an amount exceeding 50 wt %. The electrolyte additive, as described above, is added to a non-aqueous organic solvent including a lithium salt. The lithium salt acts as a supply source of lithium ions in the battery, making the basic operation of a lithium battery possible. The non-aqueous organic solvent plays a role of a medium wherein ions capable of participating in the electrochemical reaction are mobilized. The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural number), LiCl, and LiI.

The concentration of the lithium salt preferably ranges from 0.6 to 2.0 M, and more preferably, 0.7 to 1.6 M. When the concentration of the lithium salt is less than 0.6 M, the electrolyte performance deteriorates due to its low ionic conductivity. When the concentration of the lithium salt is greater than 2.0 M, the lithium ion mobility decreases due to an increase of the electrolyte viscosity.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include n-methyl acetate, n-ethyl acetate, n-propyl acetate, and the like. Examples of ethers include dibutyl ether, and the like, and an example of a suitable ketone is polymethylvinylketone. However, the non-aqueous organic solvent is not limited to the above solvents.

It is preferable to use a mixture of a chain carbonate and a cyclic carbonate. The cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, the electrolyte performance may be enhanced.

In addition, the electrolyte of the present invention may include mixtures of the carbonate solvents and aromatic hydrocarbon solvents of formula (2):

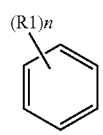

(2)

where $R_1$ is a hydrogen, a halogen, a nitro, a $C_1$ to $C_{10}$ alkyl or a $C_1$ to $C_{10}$ alkyl where at least one hydrogen is substituted with halogen, and n is an integer of 0 to 6.

Examples of aromatic hydrocarbon solvents include benzene, fluorobenzene, chlorobenzene, nitrobenzene, toluene, fluorotoluene, trifluorotoluene, and xylene. The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, the electrolyte performance may be enhanced.

The electrolyte of the present invention is prepared by adding lithium salt and the additive compound to an organic solvent. Generally, the additive compound is added to the organic solvent with the lithium salt dissolved therein, but the addition order is not important.

The present invention provides a lithium battery comprising the electrolyte. The lithium battery of the present invention uses a material that reversibly intercalates/deintercalates the lithium ions (lithiated intercalation compound) as a positive active material, and a lithium metal, a material that reversibly forms a lithium-containing compound, or a carbonaceous material that reversibly intercalates/deintercalates the lithium ions as a negative active material.

A lithium secondary battery is fabricated by the following process. Positive and negative electrodes are fabricated by coating a slurry including active materials on a current collector of an appropriate thickness and length. An electrode assembly is prepared by winding or laminating a positive electrode, a negative electrode, and a separator interposed between the positive and negative electrodes, and then placing the electrode assembly into a battery case.

An electrolyte of the present invention is injected into the case, and the upper part of the battery case is sealed.

The separator interposed between the positive and negative electrodes is a polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator. A cross-sectional structure of the lithium battery prepared by the above process is shown in FIG. 1.

The electrolyte of the present invention may be applied to all types of lithium batteries, including a lithium primary battery and a lithium secondary battery. The lithium secondary battery may realize significant overcharge properties compared with a conventional non-aqueous electrolyte.

The present invention is further explained in more detail with reference to the following examples. These examples, however, should not in any sense be interpreted as limiting the scope of the present invention.

EXAMPLES AND COMPARATIVE EXAMPLE

Example 1

Ethylene carbonate/ethylmethyl carbonate/propylene carbonate/fluorobenzene (EC/EMC/PC/FB) were mixed in a volume ratio of 30:55:5:10 to prepare a non-aqueous organic solvent, and 1.3 M $LiPF_6$ was added to the solvent to prepare a solution. 0.25 g of 4-nitroimidazole were further added to 5 g of the solution to prepare an electrolyte.

$LiCoO_2$ having an average particle diameter of 10 nm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus manufacturing a positive electrode having a width of 4.9 cm and a thickness of 113 μm. Mesocarbon fiber (MCF from PETOCA company) as a negative active material, oxalic acid, and PVdF as a binder were mixed in a weight ratio of 89.8:0.2:10 to prepare a negative slurry. The slurry was coated on a copper foil, dried, and compressed by a roll press, thus manufacturing a negative electrode having a width of 5.1 cm and a thickness of 117 μm. Between the manufactured positive and negative electrodes, a polyethylene porous film separator having a width of 5.3 cm and a thickness of 18 μm was interposed, followed by winding and placing into prismatic cans. 2.3 g of the electrolyte prepared as above were injected into the cans, thus fabricating the prismatic-type lithium secondary battery cell.

Example 2

A lithium secondary battery cell was prepared in the same manner as in Example 1, except that 4-nitroimidazole was used in an amount of 0.05 g.

Example 3

A lithium secondary battery cell was prepared in the same manner as in Example 1, except that 4-chloroimidazole was used.

Comparative Example 1

1M LiPF6 was added to a non-aqueous organic solvent of ethylene carbonate/ethylmethyl carbonate/propylene carbonate/fluorobenzene (EC/EMC/PC/FB) mixed in a volume ratio of 30:55:5:10 to prepare an electrolyte. The cells were overcharged with 2 A for 2.5 hours to evaluate overcharge safety. The results are shown in Table 1.

TABLE 1

|  | Standard capacity (mAh) | Capacity at 2 C (mAh) | Overcharge safety* |
|---|---|---|---|
| Example 1 | 840 | 780 | 5L0 |
| Comparative Example 2 | 843 | 71 | 5L5 |

Note:
The number preceding "L" indicates the number of tested cells.

The results of the safety test were rated as follows:

L0: effective, L1: leakage, L2: flash, L2: flame, L3: smoke, L4: ignition, L5: explosion.

As shown in Table 1, the overcharge safety of Example 1 was better than the safety of the Comparative Example 1 without deterioration of capacity characteristics.

Figure 2A:
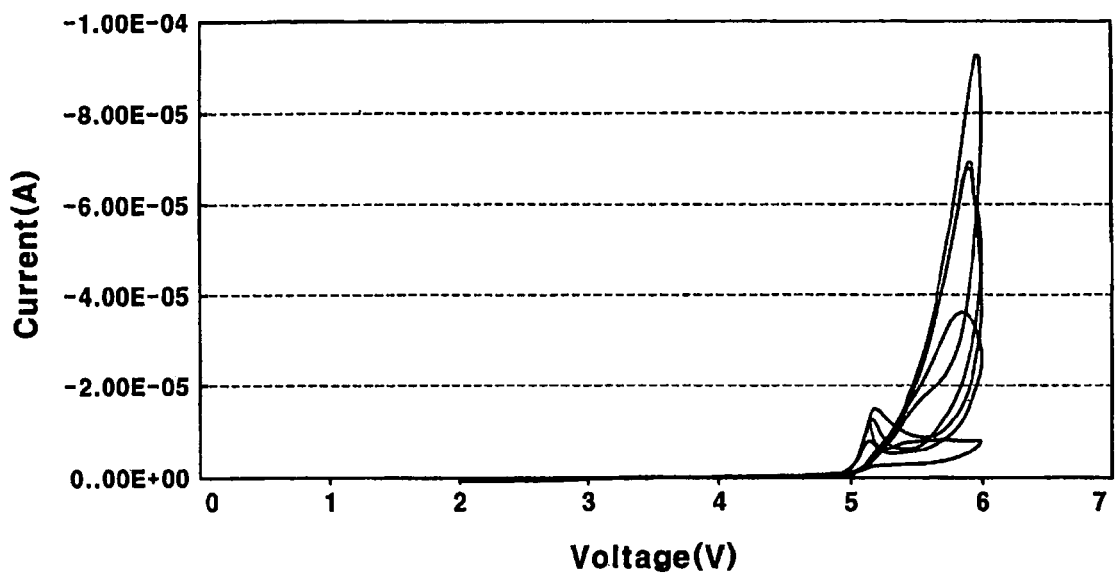
FIGS. 2A and 2B are graphs illustrating measurement results of cyclic voltammetry with respect to electrolytes of Example 1 of the present invention and Comparative Example 1, respectively.
Figure 2B:
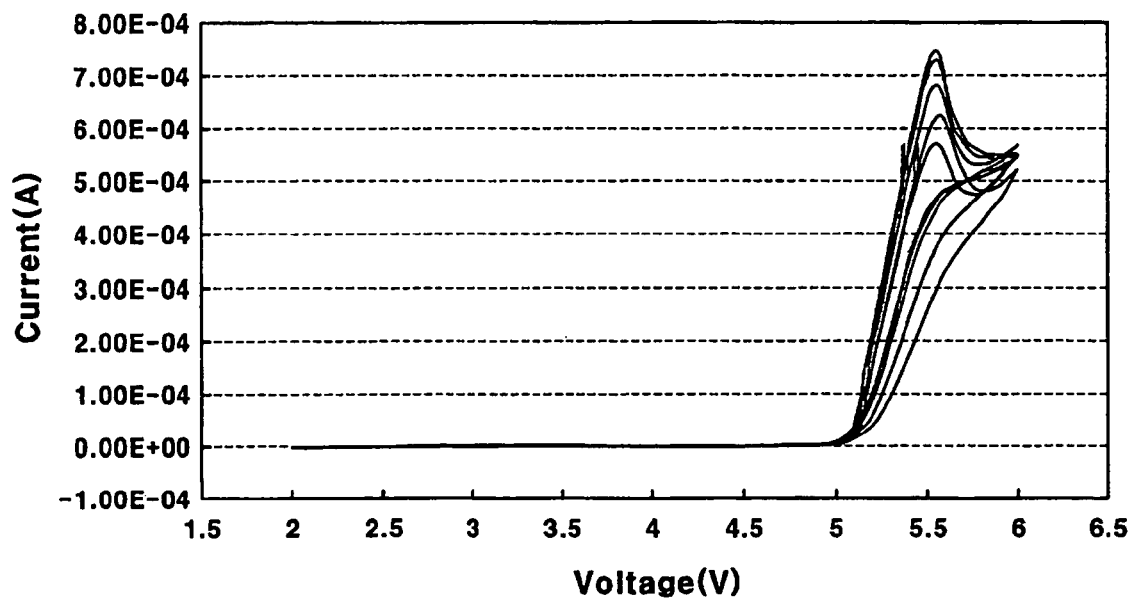

Cyclic voltammograms of the cells of Example 1 and Comparative Example 1 were studied. The cyclic voltammograms were measured in the voltage range of 2.0 V to 6.0 V at a scanning rate of 10 mV/sec. Lithium metal was used as the counter electrode, and a platinum electrode was used between the working electrode and the counter electrode in the cell. FIGS. 2A and 2B show the results of Example 1 and Comparative Example 1, respectively. As shown in FIG. 2A, the electrolyte of Example 1 shows peaks caused by the decomposition of the additive compound at a voltage of 5 to 6 V indicating that the decomposition of the compound consumes overcharge current and improves safety. On the contrary, as shown in FIG. 2B, current density in case of Comparative Example 1 was maintained constantly with cycling.

Figure 3A:
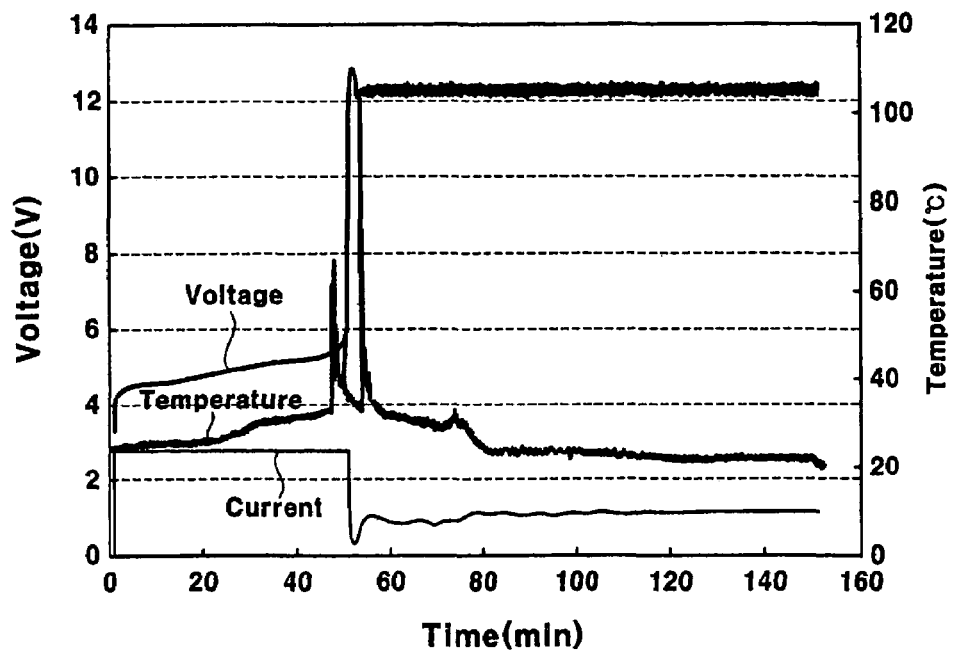
FIGS. 3A and 3B show current, voltage, and temperature characteristics of the battery cells according to Example 1 of the present invention, and Comparative Example 1, during overcharge.
Figure 3B:
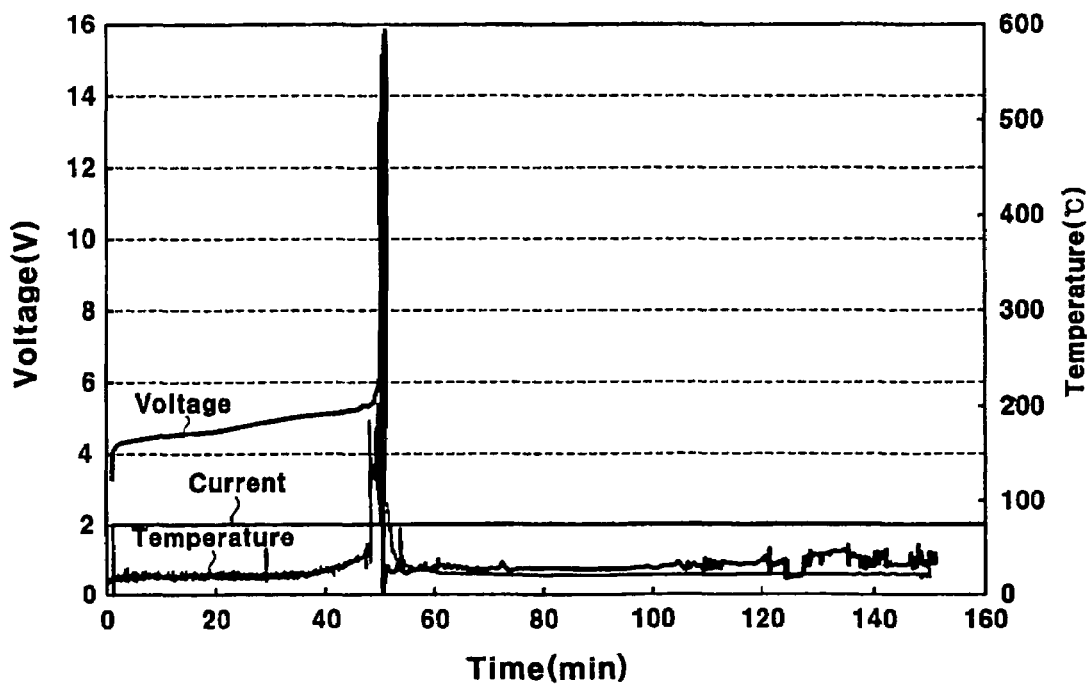

FIG. 3A shows the current, the temperature, and the voltage of the cell of Example 1, when overcharging with a current of 2 A to a voltage of 12 V. As shown in FIG. 3A, the temperature of the cell of Example 1 increased early, and overcharge reaction was inhibited by shutting down the pores of the separator. This resulted because the additive compound consumed the overcharge current by forming a polymerization layer on the electrodes. FIG. 3B shows the current, the temperature, and the voltage of the cell of Example 1, when overcharging with a current of 2 A to a voltage of 12 V. As shown in FIGS. 3B and 4C, the temperature rose abruptly, and the voltage dropped to 0 V overcharging.

The lithium battery including the electrolyte of the present invention showed improved electrochemical properties, such as capacity at high rate and safety characteristics compared to the battery including the conventional non-aqueous electrolyte, which did not include the additive compound.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium battery comprising:
   a non-aqueous organic solvent;
   a lithium salt; and
   an additive compound represented as in the formula (1):

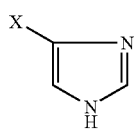

(1)

where X is selected from the group consisting of an alkoxy, a halogen, and $COOCH_3$.

2. The electrolyte for a lithium secondary battery according to claim 1, wherein the additive compound is chloroimidazole.

3. The electrolyte for a lithium secondary battery according to claim 1, wherein the additive compound is used in an amount of 0.1 to 50 wt % based on total weight of electrolyte.

4. The electrolyte for a lithium secondary battery according to claim 3, wherein the additive compound is used in an amount of 1 to 5 wt % based on total weight of electrolyte.

5. The electrolyte for a lithium secondary battery according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

6. The electrolyte for a lithium secondary battery according to claim 5, wherein the lithium salt is used at a concentration in the range of 0.6 to 2.0 M.

7. The electrolyte for a lithium battery according to claim 1, wherein the non-aqueous organic solvent is at least one selected from the group consisting of a carbonate, an ester, an ether, and a ketone.

8. The electrolyte for a lithium battery according to claim 7, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

9. The electrolyte for a lithium battery according to claim 7, wherein the carbonate is a mixed solvent of a cyclic carbonate and a chain carbonate.

10. The electrolyte for a lithium battery according to claim 1, wherein the organic solvent comprises a mixed solvent of a carbonate solvent and an aromatic hydrocarbon solvent.

11. The electrolyte for a lithium battery according to claim 10, wherein the aromatic hydrocarbon solvent is a compound of formula (2):

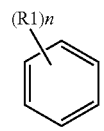

(2)

where $R_1$ selected from the group consisting of a hydrogen, a halogen, a nitro, a $C_1$ to $C_{10}$ alkyl or a $C_1$ to $C_{10}$ alkyl where at least one hydrogen is substituted with halogen, and n is an integer of 0 to 6.

12. The electrolyte for a lithium battery according to claim 10 wherein the aromatic hydrocarbon solvent is at least one selected from the group consisting of benzene, fluorobenzene, toluene, fluorotoluene, trifluorotoluene, xylene, and mixtures thereof.

13. The electrolyte for a lithium battery according to claim 10, wherein the carbonate solvent and the aromatic hydrocarbon solvent are mixed in a volume ratio of 1:1 to 30:1.

14. A lithium battery comprising:
   a positive electrode including a material to reversibly intercalate/deintercalate lithium ions as a positive active material;
   a negative electrode including, as a negative active material, at least one of:
      a material to reversibly intercalate/deintercalate lithium ions,
      a material to reversibly form a lithium-containing compound,
      a lithium metal, and
      a lithium-containing alloy; and
   a non-aqueous electrolyte comprising
      a non-aqueous organic solvent,
      a lithium salt, and
      an additive compound represented as in the formula (1):

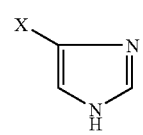

(1)

where X is selected from the group consisting of an alkoxy, a halogen, and $COOCH_3$.

15. The lithium battery according to claim 14, wherein the lithium secondary battery includes a lithium ion battery or a lithium polymer battery.

16. The lithium secondary battery according to claim 14, wherein the additive compound is chloroimidazole.

17. The lithium secondary battery according to claim 14, wherein the additive compound is used in an amount of 0.1 to 50 wt % based on total weight of electrolyte.

18. The lithium secondary battery according to claim 17, wherein the additive compound is used in an amount of 1 to 5 wt % based on total weight of electrolyte.

19. The lithium secondary battery according to claim 14, wherein the lithium salt is at least one selected from the group consisting of $LiPF_6$, $LiBF_4$, $LiSbF_6$, $LiAsF_6$, $LiClO_4$, $LiCF_3SO_3Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

20. The lithium secondary battery according to claim 19, wherein the lithium salt is used at a concentration in the range of 0.6 to 2.0 M.

21. The lithium battery according to claim 14, wherein the non-aqueous organic solvent is at least one selected from the group consisting of a carbonate, an ester, an ether, and a ketone.

22. The lithium battery according to claim 21, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

23. The lithium battery according to claim 21, wherein the carbonate is a mixed solvent of a cyclic carbonate and a chain carbonate.

24. The lithium battery according to claim 14, wherein the organic solvent comprises a mixed solvent of a carbonate solvent and an aromatic hydrocarbon solvent.

25. The lithium battery according to claim 24, wherein the aromatic hydrocarbon solvent is a compound of formula (2):

(2)

where $R_1$ selected from the group consisting of a hydrogen, a halogen, a nitro, a $C_1$ to $C_{10}$ alkyl or a $C_1$ to $C_{10}$ alkyl where at least one hydrogen is substituted with halogen, and n is an integer of 0 to 6.

26. The lithium battery according to claim 24 wherein the aromatic hydrocarbon solvent is at least one selected from the group consisting of benzene, fluorobenzene, toluene, fluorotoluene, trifluorotoluene, xylene, and mixtures thereof.

27. The lithium battery according to claim 24, wherein the carbonate solvent and the aromatic hydrocarbon solvent are mixed in a volume ratio of 1:1 to 30:1.

* * * * *